US008593289B1

(12) United States Patent
Carlisle

(10) Patent No.: US 8,593,289 B1
(45) Date of Patent: Nov. 26, 2013

(54) SYSTEM AND METHOD FOR THE DETECTION OF SEVERE WEATHER CONDITIONS

(76) Inventor: Richard Alan Carlisle, Valrico, FL (US)

( * ) Notice: Subject to any disclaimer, the term of this patent is extended or adjusted under 35 U.S.C. 154(b) by 72 days.

(21) Appl. No.: 13/467,541

(22) Filed: May 9, 2012

Related U.S. Application Data

(60) Provisional application No. 61/457,668, filed on May 9, 2011.

(51) Int. Cl.
*G08B 21/00* (2006.01)
(52) U.S. Cl.
USPC .............................................. 340/601; 702/3
(58) Field of Classification Search
USPC ........... 340/601, 540, 686.6, 600; 702/2, 3, 4; 324/344
See application file for complete search history.

(56) References Cited

U.S. PATENT DOCUMENTS 7,688,214 B1* 3/2010 Karamanian et al. ......... 340/601
2005/0258971 A1* 11/2005 Greenstein et al. ........... 340/601

OTHER PUBLICATIONS

Thunderbolt Internation, Inc., Thunder Bolt Backlit Storm Detector: Take the Guesswork Out of Storm Safety, 2011.
H. L. Johnson, Jr., R.D. Hart, M. A. Lind, R. E. Powell, and J. L. Stanford, Measurements of Radio Frequency Noise from Severe and Nonsevere Thunderstorms, Department of Physics, Iowa State University, Ames 50011, Monthly Weather Review, Jun. 1977, vol. 105, pp. 734-747.
J. L. Stanford, M. A. Lind, and G. S. Takle, Electromagnetic Noise Studies of Severe Convective Storms in Iowa: the 1970 Storm Season, Dept. of Physics, Iowa State University, Ames, Journal of the Atmospheric Sciences, Apr. 1971, vol. 28, pp. 436-448.

* cited by examiner

*Primary Examiner* — Jeffery Hofsass
(74) *Attorney, Agent, or Firm* — Molly Sauter; Ronald E. Smith; Smith & Hopen, P.A.

(57) ABSTRACT

A system and method for the detection of severe weather conditions in which radio frequency (RF) signals are received by an AM radio operating in the 525 kHz AM frequency band and the signals are filtered to remove unwanted frequencies. The energy level of the signal is then measured and if the energy level of the signal is above a threshold value, an evaluation period for the signal is initiated. During the evaluation period, the percentage of time the energy level of the signal is above the threshold value is calculated. If the percentage of time that the energy level of the signal is between about 50% and 99%, then a severe thunderstorm warning may be generated. If the percentage of time that the energy level of the signal is above 99%, then a tornado warning may be generated.

22 Claims, 2 Drawing Sheets

SYSTEM AND METHOD FOR THE DETECTION OF SEVERE WEATHER CONDITIONS

CROSS-REFERENCE TO RELATED APPLICATIONS

The present invention claims priority to currently co-pending U.S. Provisional Patent Application No. 61/457,668, filed on May 9, 2011, and entitled "Device to Detect and Provide Warning for Severe Storms and Tornadoes using Radio Frequency Emissions in the AM Bandwidth from Lightning and other Electromagnetic Phenomenon."

BACKGROUND OF THE INVENTION

A severe storm traveling at 60 mph will cover 30 miles in 30 minutes. This period of time is considered to be the ideal warning time for an individual in the path of a storm to take the necessary actions to insure their safety during severe weather conditions.

A radio atmospheric signal, or sferic, is a broadband electromagnetic impulse that is known to occur as a result of natural atmospheric lightning discharges. The radio frequency (RF) signal resulting from lightning is relatively strong and broad in spectrum. There are essentially three types of radio atmospheric signals (sferics). Cloud-to-ground is the most intense and dangerous form of sferic, commonly exhibiting RF signals between 1 kHz and several Mhz. Cloud-to-ground sferics comprise as little as 10% of the total electrical activity associated with severe weather and have been shown to have no correlation with tornadic activity (as shown by the studies conducted by NOAA such as the 1991 Beryl tropical storm over the Carolinas). Cloud-to-cloud and intracloud sferics are not visible during the day and comprise the majority of sferic activity in a storm. Intracloud sferics exhibit RF frequencies most commonly between 100 kHz and 10 MHz. Only infrequent and very intense intracloud discharges produce frequencies at or below 300 kHz. For sferic RF transmissions above 10 kHz, there is an inverse relation between sferic RF frequency and signal strength.

Researchers originally believed that lightning activity was responsible for tornado-genesis and for providing the energy necessary to maintain tornadic activity. Subsequent studies using sophisticated wide area lightning detection arrays (i.e., National Lightning Detection Network et al.) have shown that areas associated with tornadoes have little to no lightning activity and are actually called "lightning holes". However, it has also been shown that electrical activity co-exists with funnel clouds in that numerous observations of luminous events, electrostatic discharges and unusual lightning displays, the smell of ozone, heat stressed vegetation, St. Elmo's fire, etc. have consistently been reported, photographed and documented. The descriptions and measurements of these events correlate with that of the behavior of plasma. Atmospheric plasma sferics associated with aurora activity, ball lightning (believed to be a stable form of a spheroid sferic plasma structure) and the Plasma Pulse Generator of tornadoes have been shown to exhibit sferic frequencies from 500 kHz to 5 MHz.

What is needed in the art is a system and method for detecting a severe storm or tornado using RF signals emitted by lightning and other electromagnetic phenomenon. Additionally, what is needed in the art is a system and method for providing adequate warning to individuals in the path of such a severe weather condition.

SUMMARY OF INVENTION

A receiver circuit tuned to the lower AM band, in combination with a processing circuit, may allow for the detection and analysis of cloud-to-ground sferics, cloud-to-cloud sferics and intracloud sferics for the determination of a severe thunderstorm, and the regular periodic oscillations of plasma pulse generator produced sferics may allow for the determination of a tornado.

In operation of the invention, a method for the detection of severe weather includes, receiving a radio frequency signal at an amplitude modulation (AM) receiver, the AM receiver tuned to receive radio frequency signals that are below the radio frequency of a plurality AM transmission stations operating within a range of the AM receiver, filtering the received radio frequency signal to remove unwanted frequencies, converting the filtered radio frequency signal to a digital signal, measuring the energy level of the digital signal, initiating an evaluation period for the signal if the energy level of the digital signal is measured to be above a threshold value, and during the evaluation period, calculating a percentage of time during the evaluation period that the energy level of the signal is above the threshold value.

The method of the invention may include, generating a severe thunderstorm warning if the percentage of time during the evaluation period that the energy level of the signal is above the threshold value is between about fifty percent and about ninety-nine percent. The method of the invention may additionally include, generating a tornado warning if the percentage of time during the evaluation period that the energy level of the signal is above the threshold value is greater than about ninety-nine percent.

In a particular embodiment, the AM receiver may be tuned to approximately 525 kHz and the radio frequency signal may be filtered to remove frequencies of approximately 60 Hz. The threshold value for the energy level of the digital signal may be dependent upon the receiver design. In a particular embodiment, the threshold value is $-5$ dB, which is representative of a distance of 50 km (30 miles) from the receiver to the thunderstorm or tornado.

A system for the detection of severe weather conditions in accordance with the present invention may include, an antenna, an amplitude modulation (AM) receiver coupled to the antenna, the AM receiver tuned to receive radio frequency signals that are below the radio frequency of a plurality AM transmission stations operating within a range of the AM receiver, a filter circuit coupled to the AM receiver to filter unwanted radio frequencies from the received radio frequency signals, an analog-to-digital converter coupled to the filter circuit, the analog-to-digital converter to convert radio frequency signals to digital signals, a processor coupled to the analog-to-digital converter, the processor to receive the digital signals from the analog-to-digital converter. The processor may further include a signal strength evaluator to measure the energy level of the digital signal and to initiate an evaluation period for the signal if the energy level of the digital signal is measured to be above a threshold value and to calculate a percentage of time during the evaluation period that the energy level of the signal is above the threshold value and a state machine coupled to the signal strength evaluator, the state machine to classify a state of the weather condition as an idle state if the percentage of time during the evaluation period that the energy level of the signal is above the threshold value is below about fifty percent, a severe thunderstorm state if the percentage of time during the evaluation period that the energy level of the signal is above the threshold value is between about fifty percent and ninety-nine percent or a tornado state if the percentage of time during the evaluation period that the energy level of the signal is above the threshold value is above about ninety-nine.

The system may further include a warning indicator coupled to the processor, the warning indicator to generate a severe thunderstorm warning if the state machine classifies the state of the weather condition as a severe thunderstorm state and to generate a tornado warning if the state machine classifies the state of the weather condition as a tornado. The warning indicator may be an audible or a visual warning indicator.

The present invention provides a system and method for detecting a severe storm or tornado using RF signals emitted by lightning and other electromagnetic phenomenon. Additionally, the system and method of the present invention provide for adequate warning to individuals in the path of such a severe weather condition.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

An amplitude modulation (AM) receiver may be adapted for the detection of severe weather conditions. The AM receiver technology employed in the present invention has the desired range and AM frequency bandwidth to detect and discriminate the electromagnetic emanations produced by severe weather conditions.

Figure 1:
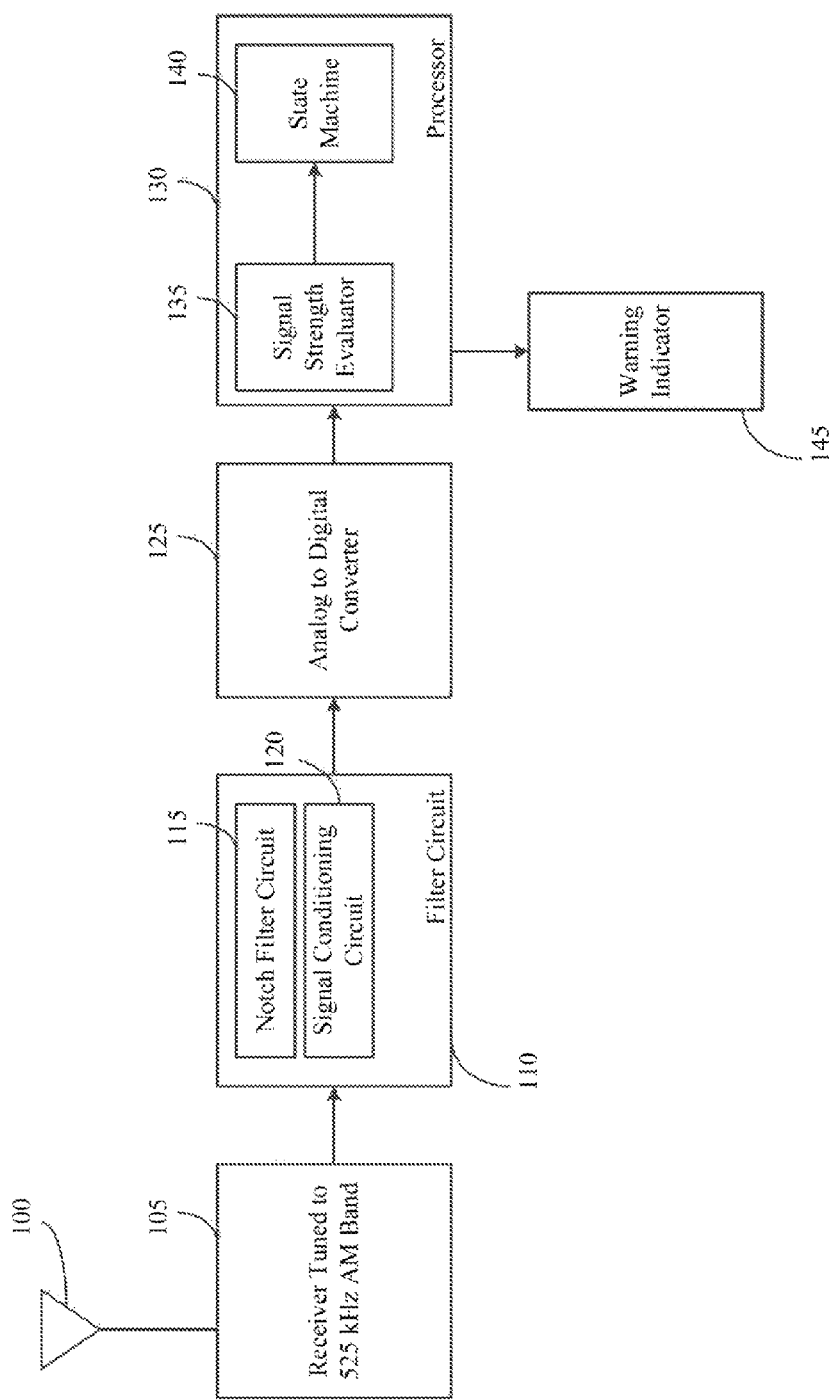
FIG. 1 is a block diagram illustrating the system for the detection of severe weather conditions in accordance with the present invention.

With reference to FIG. 1, a small loopstick antenna 100 is coupled to an AM receiver 105 that is focused on a narrow frequency range in the lower AM frequency band. Focusing the AM receiver on a narrow frequency range in the lower AM frequency band allows for the detection of changes in severe weather condition intensity as measured by the number and type of atmospheric radiation discharges and the distance or motion of the severe weather condition as measured by the signal source amplitude. The circuitry of the AM receiver 105 is tuned to select an RF band to avoid interference from local AM transmission stations in the range of the AM receiver. In a particular embodiment, the AM receiver 105 is tuned to approximately 525 kHz, however other RF bands are within the scope of the present invention.

In order to discriminate between real lightning and artificial RF interference, noise gates and filters designed to eliminate the man-made 60 Hz cycle hum are employed. The man-made 60 Hz cycle hum is known to be generated by electrical power lines. To eliminate the 60 Hz cycle hum, in addition to any other unwanted frequencies, a filter circuit 110 is coupled to an output of the AM receiver. The filter circuit 110 of the present invention may include a notch filter circuit 115 to remove the 60 Hz cycle hum and a signal conditioning circuit 120 to further process the RF signal received by the AM receiver.

An analog to digital converter 125 may be coupled to the output of the filter circuit 110. The analog to digital converter may convert the analog RF signal to a digital signal, as is commonly known in the art of signal processing. The digital signal from the analog to digital converter 125 may then be communicated to the processor 130.

When in an active logging state, the processor 130 may monitor the energy level of the signal from the AM receiver 105 via the analog to digital converter 125. When a burst of noise is detected that exceeds a substantial level of energy, the processor 130 may initiate a real-time evaluation of the energy for a period of time equal to an evaluation period. During the evaluation period, the processor 130 may include a signal strength evaluator 135 and a state machine 140. The signal strength evaluator 135 may be used to measure the energy level of the received signal and to initiate an evaluation period for the signal if the energy level of the digital signal is measured to be above a threshold value. During the evaluation period, the signal strength evaluator 135 may calculate a percentage of time that the energy level of the signal is above the threshold value. In a particular embodiment, the evaluation period may be about one minute and the signal strength of any RF signals that may be present are measured during the one minute evaluation period. Only signal strengths of a certain magnitude and duration may be considered to be associated with a severe weather condition. The calculations of the signal strength evaluator 135 may be provided to the state machine 140. The state machine 140 may then determine if the current weather condition is an idle state, a severe thunderstorm state or a tornado state.

In a particular embodiment, the state machine 140 may determine that an idle weather condition exists relative to the location of the AM receiver 105 if the percentage of time that the energy level of the signal is above the threshold value is less that about 50%. The state machine 140 may determine that a severe thunderstorm condition exists relative to the location of the AM receiver 105 if the percentage of time that the energy level of the signal is above the threshold value is between about 50% and about 99%. The state machine 140 may determine that a tornado condition exists relative to the location of the AM receiver 105 if the percentage of time that the energy level of the signal is above the threshold value is greater than about 99%. These percentages are exemplary in nature and are not intended to limit the scope of the invention. The threshold value for the energy level of the digital signal may be dependent upon the receiver design. In a particular embodiment, the threshold value is −5 dB, which is representative of a distance of 50 km (30 miles) from the receiver to the thunderstorm or tornado.

A severe thunderstorm warning may be triggered if the signal strength exceeds an amplitude threshold value indicating that the proximity of the severe thunderstorm storm is within 30 miles (50 km) range of the AM receiver 105 and when the frequency of lightning strikes exceeds a 50% time domain threshold (i.e., 30 seconds of a 60 second sample period). A severe thunderstorm is a dangerous weather phenomenon and may cause significant damage resulting from cloud-to-ground lightning, heavy rain, hail and high winds. Straight line winds as high as 100 miles an hour have been observed over wide areas in these types of storms (equivalent to a category 1 hurricane).

All tornadoes equal or greater than EF0 (Enhanced Fujita scale of 0) in strength are driven by the presence of a plasma pulse generator located within a 6 km distance above the actual funnel. Many eyewitnesses have observed the yellow, orange or blue ball of light associated with the plasma pulse generator in tornadoes, including this author. When the plasma pulse generator is disrupted or extinguished by turbulence, disruption of the inflow of warm moist air (known as convective inhibitors), or a disturbance of the energy field, the tornado quickly dissipates. The plasma pulse generator generates a unique RF signature that is easily identified by the AM receiver tuned to the proper frequency. The signal produced by a plasma pulse generator will pulse at somewhat regular intervals. This pulsation phenomenon has been correlated with the regular periodic oscillations in the waveform associated with the electrical activity of a storm as detected by the receiver. As already described, the frequency and duration of lightning discharges as measured in the time domain exceeding a 50% threshold will cause a severe thunderstorm alert. Electrical activity exceeding 99% of the measurement interval of one minute will cause a tornado alert. The state machine 130 may used to discriminate between the various actions of the device.

The results of the minute-by-minute recordings of signal amplitude may be compared to establish changes in storm intensity and motion to determine if the storm is strengthening or weakening, or moving toward or away from the AM receiver 105. These results may be stored on a USB recorder or SD card, as is commonly known in the art.

Upon the determination that a severe thunderstorm condition or a tornado condition exists, the state machine 140 may cause a warning indicator 145 to generate an audible or a visual warning indication to a user of the AM receiver 105. Additionally, specific instructions may be provided as part of the alarm system via an LCD display. The use of only a loud siren sufficient to wake sleeping citizens will simply cause fear and confusion. Distinct instructions may provide information specific to the type of alarm and actions that should be taken.

In addition, the weather condition evaluation results from the processor 130 may be stored on a data logger or transmitted to another location utilizing telemetry, as is commonly known in the art.

Figure 2:
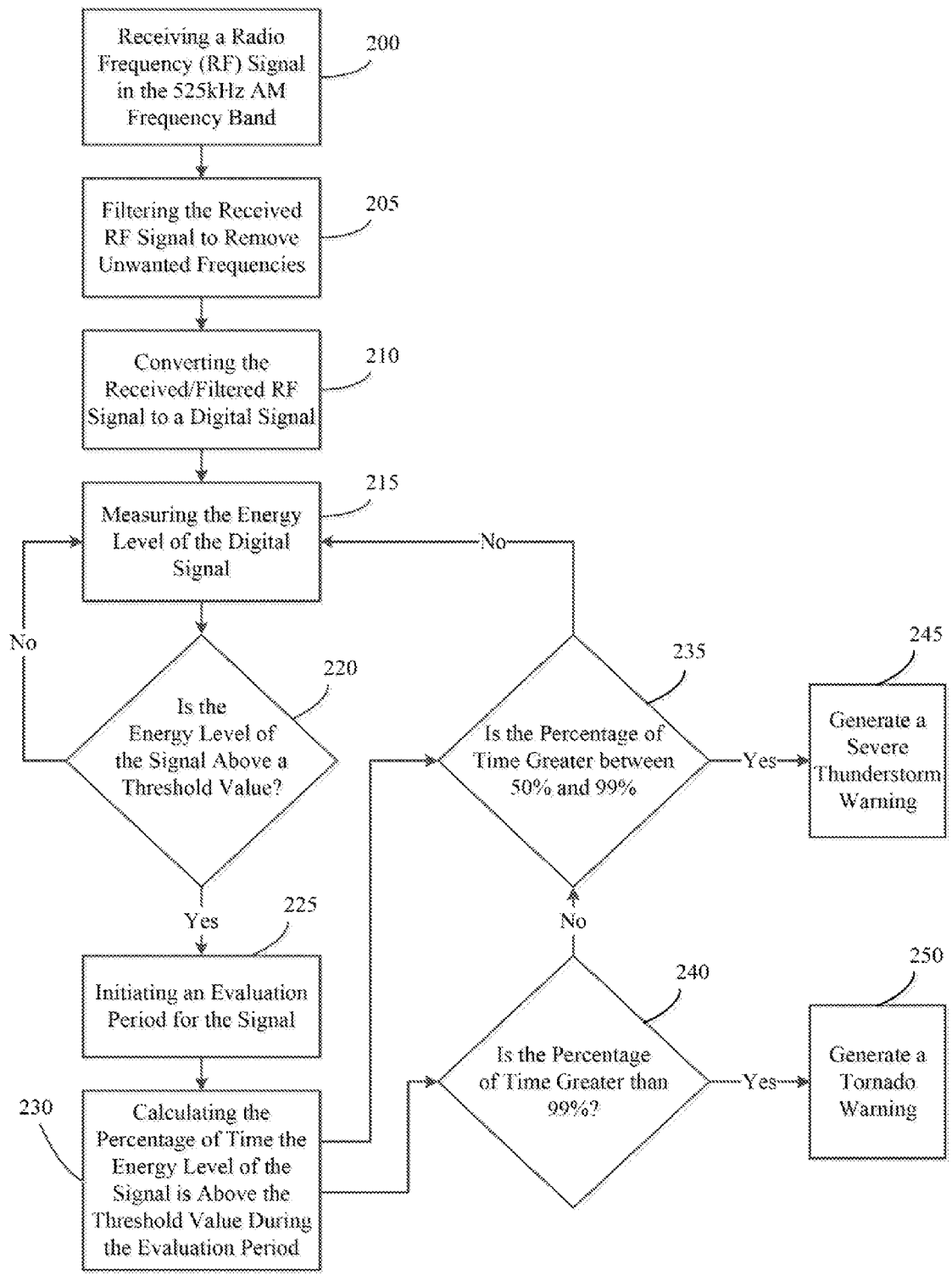
FIG. 2 is a flow diagram illustrating a method for the detection of severe weather conditions in accordance with the present invention.

In operation, with reference to FIG. 2, a method for the detection of severe weather conditions includes, receiving radio frequency (RF) signal in the 525 kHz AM frequency band 200 and filtering the received RF signal to remove unwanted frequencies 205. Once the unwanted frequencies have been removed, the filtered RF signal may be converted to a digital signal 210. The energy level of the digital signal is then measured 215 and if the energy level of the signal is above a threshold value 220, an evaluation period for the signal is initiated 225. During the evaluation period, the percentage of time the energy level of the signal is above the threshold value is calculated 230. If the percentage of time that the energy level of the signal is between about 50% and 99% 235, then a severe thunderstorm warning may be generated 245. If the percentage of time that the energy level of the signal is above 99% 240, then a tornado warning may be generated 250.

In accordance with a particular embodiment for calculating the percentage of time that the energy level of the signal is above the threshold value 230, the evaluation period may be one minute. A timer may be started when the energy level of the signal is above the threshold value and the timer may be stopped if the energy level of the signal falls below the threshold value for more than about 100 ms. The timer may be started and stopped during the evaluation period dependent upon whether the energy level is above or below the threshold value. After the evaluation period has expired, a total time that the measured energy level of the signal was above the threshold value during the evaluation period and a total time that the measured energy level of the signal was below the threshold value may be determined. A ratio of the total time the measured energy level of the signal was above the threshold value to the total time the measured energy level of the signal was below the threshold value may be calculated. This calculated ratio is representative of the percentage of time the energy level of the signal is above the threshold value during the evaluation period of the signal and may be used to indicate a severe thunderstorm warning is the percentage is between about 50% and 99% or a tornado warning if the percentage is above 99%.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for the detection of severe weather conditions, the method comprising:

receiving a radio frequency signal at an amplitude modulation (AM) receiver, the AM receiver tuned to receive radio frequency signals that are below the radio frequency of a plurality AM transmission stations operating within a range of the AM receiver;

filtering the received radio frequency signal to remove unwanted frequencies;

converting the filtered radio frequency signal to a digital signal;

measuring the energy level of the digital signal; and initiating an evaluation period for the signal if the energy level of the digital signal is measured to be above a threshold value, and during the evaluation period, calculating a percentage of time during the evaluation period that the energy level of the signal is above the threshold value.

2. The method of claim 1, further comprising, generating a severe thunderstorm warning if the percentage of time during the evaluation period that the energy level of the signal is above the threshold value is between about fifty percent and about ninety-nine percent.

3. The method of claim 1, further comprising, generating a tornado warning if the percentage of time during the evaluation period that the energy level of the signal is above the threshold value is greater than about ninety-nine percent.

4. The method of claim 1, wherein the AM receiver is tuned to approximately 525 kHz.

5. The method of claim 1, wherein filtering the received radio frequency signal to remove unwanted frequencies further comprises, filtering the received radio frequency signal to remove frequencies of approximately 60 Hz.

6. The method of claim 1, wherein the evaluation period for the signal is equal to about one minute.

7. The method of claim 1, wherein calculating a percentage of time during the evaluation period that the energy level of the signal is above the threshold value further comprises:

starting a timer when the measured energy level of the signal is above the threshold value;

stopping the timer if the measured energy level of the signal falls below the threshold value for a predetermined period time, and continuing starting and stopping the timer, dependent upon the measured energy level, during the evaluation period;

determining a total time that the measured energy level of the signal was above the threshold value;

determining a total time that the measured energy level of the signal was below the threshold value; and calculating a ratio of the total time the measured energy level of the signal was above the threshold value to the total time that the measured energy level of the signal was below the threshold value.

8. The method of claim 5, wherein the predetermined period of time is about 100 ms.

9. The method of claim 2, wherein generating a severe thunderstorm warning if the percentage of time is between about fifty percent and about ninety-nine percent further comprises, generating an audible or visual alarm associated with the severe thunderstorm warning.

10. The method of claim 3, wherein generating a tornado warning if the percentage of time during the evaluation period that the energy level of the signal is above the threshold value is greater than about ninety-nine percent further comprises, generating an audible or visual alarm associated with the tornado warning.

11. The method of claim 1, wherein the threshold value is about −5 dB.

12. A system for the detection of severe weather conditions, the system comprising:
   an antenna;
   an amplitude modulation (AM) receiver coupled to the antenna, the AM receiver tuned to receive radio frequency signals that are below the radio frequency of a plurality AM transmission stations operating within a range of the AM receiver;
   a filter circuit coupled to the AM receiver to filter unwanted radio frequencies from the received radio frequency signals;
   an analog-to-digital converter coupled to the filter circuit, the analog-to-digital converter to convert radio frequency signals to digital signals;
   a processor coupled to the analog-to-digital converter, the processor to receive the digital signals from the analog-to-digital converter, the processor comprising:
      a signal strength evaluator to measure the energy level of the digital signal and to initiate an evaluation period for the signal if the energy level of the digital signal is measured to be above a threshold value and to calculate a percentage of time during the evaluation period that the energy level of the signal is above the threshold value; and
      a state machine coupled to the signal strength evaluator, the state machine to classify a state of the weather condition as an idle state if the percentage of time during the evaluation period that the energy level of the signal is above the threshold value is below about fifty percent, a severe thunderstorm state if the percentage of time during the evaluation period that the energy level of the signal is above the threshold value is between about fifty percent and ninety-nine percent or a tornado state if the percentage of time during the evaluation period that the energy level of the signal is above the threshold value is above about ninety-nine.

13. The system of claim 12, further comprising, a warning indicator coupled to the processor, the warning indicator to generate a severe thunderstorm warning if the state machine classifies the state of the weather condition as a severe thunderstorm state and to generate a tornado warning if the state machine classifies the state of the weather condition as a tornado.

14. The system of claim 13, wherein the severe thunderstorm warning and the tornado warning are an audible or visual warning.

15. The system of claim 12, wherein the AM receiver is tuned to approximately 525 kHz.

16. The system of claim 12, wherein the unwanted frequencies filtered by the filter circuit are frequencies of approximately 60 Hz.

17. The system of claim 12, wherein the evaluation period for the signal is equal to about one minute.

18. The system of claim 12, wherein the processor, during the evaluation period, starts a timer when the energy level of the signal is above the threshold value and stops the timer when the energy level of the signal falls below the threshold value for a predetermined period of time, and the processor to continue to start and stop the timer based upon the measured energy level during the evaluation period to determine a total time that the measured energy level of the signal was above the threshold value and to determine a total time that the measured energy level of the signal was below the threshold value and calculating a ratio of the total time the measured energy level of the signal was above the threshold value to the total time that the measured energy level of the signal was below the threshold.

19. The system of claim 18, wherein the predetermined period of time is about 100 ms.

20. The system of claim 12, wherein the antenna is a loopstick antenna.

21. The system of claim 12, where the threshold value is about −5 dB.

22. The system of claim 12, wherein the filter circuit further comprises:
   a notch filter circuit; and
   a signal conditioning circuit.

* * * * *